United States Patent [19]

Heckel et al.

[11] 4,035,537

[45] July 12, 1977

[54] THERMAL INSULATING INTERLINING IN WEB FORM FOR TEXTILES

[75] Inventors: Klaus Heckel, Weinheim; Friedemann Klaffke, Gorxheim, both of Germany

[73] Assignee: Firma Carl Freudenberg, Weinheim, Germany

[21] Appl. No.: 681,635

[22] Filed: Apr. 29, 1976

[30] Foreign Application Priority Data

May 5, 1975   Germany .................. 7514101[U]

[51] Int. Cl.² ........................................ B32B 3/26
[52] U.S. Cl. ............................ 428/155; 428/310; 428/337; 428/340
[58] Field of Search .......... 428/155, 265, 310, 337, 428/340, 315, 332

[56] References Cited

U.S. PATENT DOCUMENTS

| | | | |
|---|---|---|---|
| 3,608,006 | 9/1971 | Hosoda et al. | 428/315 |
| 3,682,739 | 8/1972 | Tesch et al. | 428/310 |
| 3,954,537 | 5/1976 | Alfter et al. | 428/310 |

*Primary Examiner*—William J. Van Balen
*Attorney, Agent, or Firm*—Burgess, Dinklage & Sprung

[57] ABSTRACT

A thermal insulating and flotational interlining material comprising a tricot fabric flame laminated to a closed-pore cross-linked polyolefin foam provided with staggered slits so as to be extensible with the tricot. The slits may be about 1 to 10 mm long spaced longitudinally in rows by about an equal amount, rows being spaced about 1 to 5 mm from one another.

4 Claims, No Drawings

THERMAL INSULATING INTERLINING IN WEB FORM FOR TEXTILES

BACKGROUND

The invention relates to a thermal insulating interlining material for textiles, consisting of a foam web which is laminated to an elastic textile material, preferably a knitted fabric.

Sport clothing and heavy winter clothing is often lined with a thermal insulating interlining material. The purpose of such materials is to prevent the loss through radiation of body heat and at the same time to prevent the formation of condensation water within the clothing.

Interlining materials for this purpose are known which absorb condensation moisture into themselves without becoming perceptibly moist at their surface while they are worn. Such materials are used, for example, in clothing whose surface consists of a material impervious to air and water. A disadvantage of such clothing is that it cannot be worn continuously, because it has to be very time-consumingly aired and dried after each use in order to remove condensation moisture from the interlining. Also, the time for which such clothing can be worn depends on the capacity of the interlining material for the storage of the condensation moisture, and hence on its volume. The result is poor wearing qualities, including particularly the relatively great weight of the garment and the manner in which it hampers the wearer's movements.

Attempts have been made to manufacture sport and heavy winter clothing in such a way that it will be continually wearable while at the same time having pleasant wearing characteristics.

In addition, it is desirable that such special purpose clothing be also of externally pleasing appearance. It should have a pleasant, textile-like feel and, drape-qualities which, in the case of a light and open outer material, will depend to a very great extent on the nature of the interlining, among other things.

At first textile materials were used as interlining which resembled padding built up of a variety of fibers and manufactured in various ways. Such materials have become known in quilted, needled and adhesive-bonded form, using synthetic and natural fibers.

In addition, open-celled foam plastics, on a basis of polyurethane for example, have been used.

In addition to the usually inelastic nature of these materials, thay have the disadvantage not only of transporting condensation moisture to the exterior of the garment, but also of holding large amounts of water in themselves. Once such interlinings have become thoroughly wet, their wearing properties are extremely poor. In the case of polyurethane foam, it is a disadvantage that this material is altered chemically by the action of organic acids, which results in the hardening and disintegration of the interlining.

THE INVENTION

The invention addresses itself to the problem of avoiding the above-described disadvantages while developing a thermal insulating interlining in web form for the lining of sport and heavy winter clothing, which will provide the clothing with pleasant wearing qualities and give it a pleasing shape, while at the same time being easy to tailor.

This problem is solved by the invention in that the interlining material consists of a sheet of foam material which is laminated to an elastic, textile fabric, preferably knit material, the foam sheet consisting of a closed-pore foamed and crosslinked polyolefin which is provided with an arrangement, created in a known manner, of slits passing through it from front to back.

Such an interlining material can be manufactured in accordance with the invention such that the foam web consists of a closed-cell, crosslinked foam polyethylene which is provided with a pattern of slits in a first process step in accordance with German "Auslegeschrift" 1,915,515. In this manner the naturally relatively inelastic foam web receives a controlled elasticity. In a second process step, the web thus prepared is laminated to a support material. This material can be, for example, a knit fabric of polyamide or cotton fibers.

In a special embodiment of the invention, the bonding of the foam plastic web to the support material can be accomplished by flame lamination.

The interlining material of the invention has flotational properties and it can be controlled to a great extent in its elasticity, its thermal insulating properties and its permeability to air by variations in the slits, in the support material and in its thickness.

The advantages achievable with the interlining of the invention consist especially in the fact that articles of clothing which are equipped with it retain, even when wet, virtually unaltered wearing properties, especially with regard to permeability to water vapor and thermal insulation, and, when the interlining is incorporated into the garment by a sewing procedure, it gives the garment good elasticity and a good feel.

Suitable fabrics comprise tricot or other warp knit fabrics extensible in at least one, and preferably only one, direction and having a yield ranging from about 4 to 20 $m^2/kg$, i.e. about 50 to 250 $g/m^2$. The foam backing has a density of about 20 to 150 $kg/m^3$ and preferably about 30 to 90 $kg/m^3$. Its thickness may range from 1 mm or less up to about 5 mm or even more although about 1 to 2 mm is preferred. As noted, a closed cell foam is preferred because it does not absorb water, has better thermal insulation properties and exhibits improved flotation properties. Polyolefins, especially polyethylene, are preferred because of their inertness to body chemicals as well as the elements. Cross-linking imparts a measure of stiffness and inelasticity which is desirable, the desired elasticity being provided by the slits.

Such slits are desirably arranged in rows spaced about 1 to 5 mm from one another, although greater or lesser spacing is permissible, e.g. preferably about 1 to 3 mm. Similarly, they may range in length from about 1 to 10 mm, preferably about 2 to 4 mm, and their linear spacing from one another within a row is also about 1 to 10 mm, preferably about 2 to 4 mm. Advantageously, the arrangement of slits in one row is offset relative to adjacent rows, as in expanded metals. The foam is laminated to the tricot with the slits running transverse, i.e. preferably perpendicular, to the direction in which the tricot per se is extensible so the laminated structure is still extensible. The laminated fabric may be incorporated into a garment as a lining with the tricot on either side, although preferably it faces the body and may constitute the inside surface of the garment.

One suitable laminated fabric in accordance with the invention is composed of nylon tricot weighing 100 g/m² and extensible in one direction. It is flame laminated to a closed cell cross-linked foam 3 mm thick before flame melting but about 2 mm thick in the laminated fabric, the foam initially having a density of about 60 kg/m³. The slits in the foam are 3 mm long and spaced linearly by an equal distance. Adjacent rows are about 1.5 mm apart and the slits are staggered in adjacent rows with about 3 mm steps, i.e. the locations in alternate rows are identical.

It will be appreciated that the instant specification and examples are set forth by way of illustration and not limitation, and various modifications and changes may be made without departing from the spirit and scope of the present invention.

What is claimed is:

1. In a thermal insulating and flotational interlining material for textile fabrics comprising a foam sheet laminated to an extensible textile sheet material, the improvement wherein said foam sheet is a closed-pore, cross-linked foamed polyolefin provided with an arrangement of slits rendering it extensible in at least one direction common with said sheet material, whereby said interlining material is extensible.

2. A thermal insulating and flotational interlining material in accordance with claim 1, wherein the slit foam sheet consists of a closed-pore, cross-linked, foamed polyethylene having a density of about 20 to 150 kg/m³, a thickness of about 1 to 5 mm and slits of about 1 to 10 mm length arranged in rows about 1 to 5 mm from one another with the slits within a row being spaced about 1 to 10 mm from one another.

3. A thermal insulating and flotational interlining material in accordance with claim 2, wherein the slit foam sheet is bonded to the extensible textile sheet material by flame lamination, the textile sheet material comprising tricot weighing about 50 to 250 g/m².

4. A thermal insulating and flotational interlining material in accordance with claim 3, wherein the polyethylene foam has a density of about 30 to 90 kg/m³ and a thickness of about 1 to 2 mm, the slits being arranged in alternately offset rows spaced about 1 to 3 mm apart, the slits being about 2 to 4 mm long and being spaced from one another within a row by about 2 to 4 mm.

* * * * *